Nov. 10, 1959      P. C. CONSOLETTI      2,912,020
SAW CHAIN
Filed Jan. 13, 1958
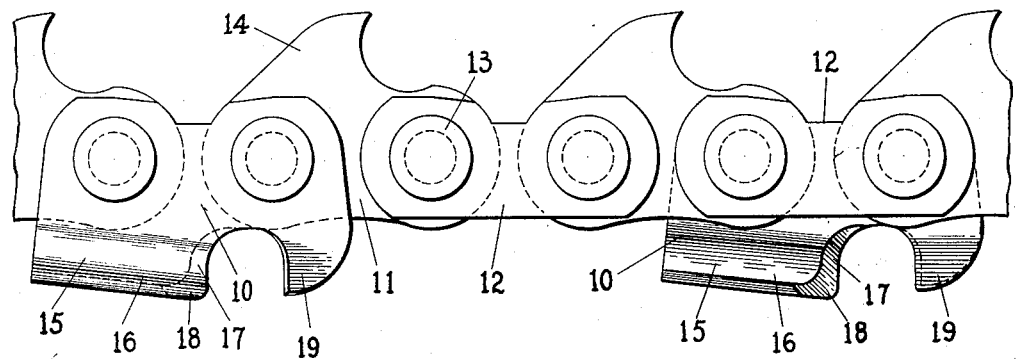
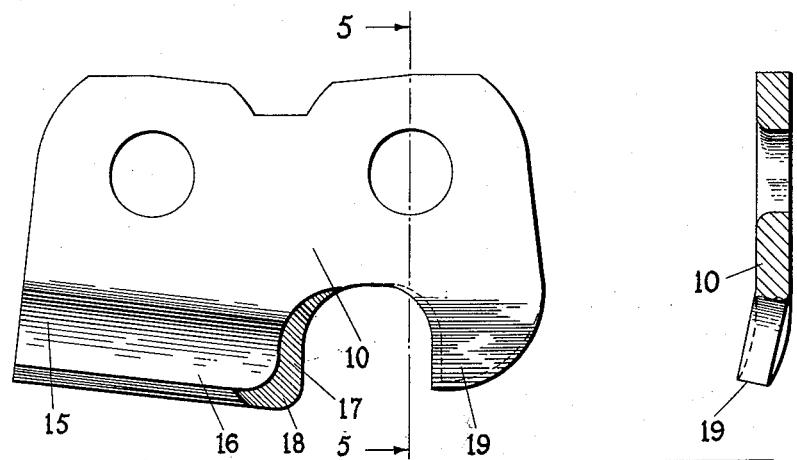
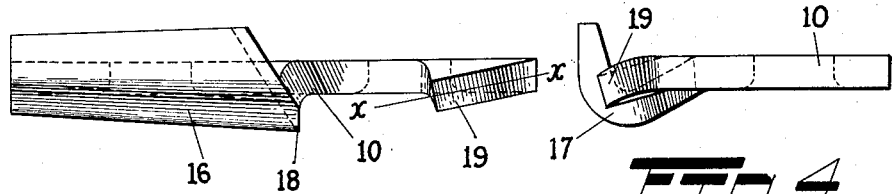
INVENTOR
PAUL C. CONSOLETTI
BY
*Rodney C. Southworth*
ATTORNEY

United States Patent Office 2,912,020
Patented Nov. 10, 1959

2,912,020
SAW CHAIN

Paul C. Consoletti, Milford, Mass., assignor to Draper Corporation, Hopedale, Mass., a corporation of Maine Application January 13, 1958, Serial No. 708,700

3 Claims. (Cl. 143—135)

This invention pertains to improvements in saw chains and more particularly, to improvements in the depth gauges which form a common part of certain links of these chains.

It is a general object of the invention to modify the depth gauges of a saw chain of the type described in such a manner that they shall improve the stability of the chain, that they will bear upon a wider portion of the kerf being cut and will counteract to a great extent the natural tendency of each particular link of which they form a part to run outwardly of the theoretically correct line of the chain travel in which event they tend to cut a wider kerf and to strain both links and joints of the chain.

A further object is that of providing the above mentioned desired result without adding materially to the cost of the production of the chain and without detracting in any way from its general efficacy in other respects.

Other objects will become more apparent from the following more detailed disclosure.

Saw chains of the type herein concerned have among other links all of which are articulated in a well known manner, cutter or router links each of which in addition to a link body has a cutter extension and a depth gauge. The general purpose and mode of operation of these parts are well known and are explained in United States Patent 2,632,484 so that no further explanation thereof need be given here.

The cutter links are arranged alternately as rights and lefts and as is well known, each router cuts out a chip the depth of its cut being governed by a depth gauge which precedes the cutter but is generally, although not in all cases, a part of the same link. These depth gauges usually have no other function.

The cutter in performing its intended function tends to cut deeper and deeper, this action however, being resisted by the depth gauge insofar as the bottom of the cut or kerf goes, but at the outside of the kerf the width of cut and thickness of chip are limited only by the rigidity of the chain and the fact each pair of cutter links acts in opposition. This, however, throws considerable strain upon the links and especially upon the rivets or other pivots. One result of this tendency of each cutter to cut deeper and deeper laterally of the kerf is that the chain vacillates or wavers from a theoretically true pathway. This cuts efficiency, consumes more power and subjects the chain to greater strain and wear.

According to the invention, each depth gauge is formed as usual as an extension of the cutter link body, is of the same thickness of stock as that body and extends generally in a continuation of the plane of the body. It is, however, twisted so that its kerf engaging end lies in a plane making an acute angle to the longitudinal plane of the link and, of course, the chain itself. This gives a broader bearing of the gauge end on the kerf causing it to engage the rounded or outer part thereof. It also, in running along the kerf under great pressure as it does, exerts a component of force laterally of the chain and in the opposite direction to that of the following cutter. That tends to keep the cutter running more accurately in the direction of the chain travel and relieves strain on the chain components.

The invention will be described in greater detail by reference to a specific embodiment thereof as illustrated in the accompanying figures of drawing, wherein:

Fig. 1 is a side view of a chain to which the invention is applied.

Fig. 2 is an enlarged detail view of one cutter link of the chain.

Fig. 3 is a bottom view of the cutter.

Fig. 4 is an end view thereof taken from the depth gauge end.

Fig. 5 is a section taken at line 5—5, Fig. 2.

Now referring to Fig. 1, a chain of a type to which the invention may be applied is comprised of cutter or router links 10, center or guide links 11, side links 12 and rivets 13 by which all links are connected to make up the chain. Each center link has a tongue 14 by which the chain is constrained to follow a path about the periphery of a grooved guide bar and also, through which the chain is driven by its sprocket. Side links 12 serve as connecting means between center links and also supplement the cutter links which, of course, are arranged alternately at the left and right sides of the chain.

Each cutter link has a cutter or router projection 15 which terminates in a tooth 16 sharpened at both the side portion 17 and the bottom or transverse portion 18. The specific shape of these cutting teeth and manner of sharpening may be varied but preferably follow some one of the accepted practices in this art.

Each cutter link 10 also has projecting therefrom a depth gauge 19 which precedes the cutter and is of slightly less length so as to limit the depth of cut of the latter. These depth gauges are of the same stock and consequently the same thickness as the link of which they form a part, and normally run along the kerf in advance of their cutter bearing on some particular portion of the kerf depending upon whether they lie in the cutter link plane or are offset either outwardly or inwardly of the chain as has been suggested.

Here a decided advantage is gained by twisting each depth gauge as shown in Figs. 2–5 so that its end will lie in a plane x—x which is disposed at an acute angle which may be between 10 to 20 degrees to the longitudinal plane of the link itself. This twist is in such direction that the outermost end of the gauge is directed toward the outermost cutting surface at the side of the tooth with which it cooperates. Of course, these teeth are offset or bent outwardly as shown for clearance purposes as the saw passes through a kerf in the material being cut. The depth gauges are alternately bent right and left to correspond to the teeth with which they function.

In action, each depth gauge in addition to performing its main function, also imparts to its link and thereby to the chain in general, a component of movement laterally, but inwardly directed as opposed to the general tendency the tooth has to pull both its link and the chain laterally outwardly to cut in deeper and deeper at the kerf wall. This results in a balancing of opposed forces and a stabilizing of the chain so that the same runs more truly in its intended path or plane.

The twisted gauge also bears near the kerf extremity where slight tilting of a link has little effect on the depth of cut.

The invention has been shown and described as applied to what may be considered the standard chain as now utilized in the trade, but it is equally applicable to other saw chains and similar types of routing cutters for working wood or other materials.

While one embodiment of the invention has been disclosed, it is to be understood that the inventive concept may be carried out in a number of ways. This invention is, therefore, not to be limited to the precise details described, but is intended to embrace all varions and modifications thereof falling within the spirit of the invention and the scope of the claims.

I claim:

1. In a saw chain comprising a plurality of pivotally connected links spaced ones of which carry cutters and depth gauges, said links which carry cutters having a planar body, the said cutter projecting therefrom and being offset outwardly of said body and bent to define a tooth extending somewhat laterally of the link body, said depth gauge extending in the direction of the cutter and generally in line with the plane of the link, but being twisted so that its trailing edge portion is offset a greater distance from said plane than its leading edge portion.

2. In a saw chain comprising a plurality of pivotally connected links spaced ones of which carry cutters and depth gauges, said links which carry cutters having a planar body, the said cutter projecting therefrom and being offset outwardly of said body and bent to define a tooth having a curved end extending first outwardly and then inwardly of the link as applied in the chain to define side and bottom tooth cutting edges, said depth gauge individual to each said link and its cutter extending in general parallel to the cutter and being twisted so that its trailing edge portion is offset a greater distance from the longitudinal plane of the link than its leading edge portion said trailing edge portion being directed toward the outer cutting edge of the next following tooth.

3. A saw chain as defined in claim 2 wherein the twisted gauge end makes an acute angel of between 10 to 20 degrees with the longitudinal plane of the link of which it forms a part.

References Cited in the file of this patent

UNITED STATES PATENTS

| | | |
|---|---|---|
| 2,508,784 | Cox | May 23, 1950 |
| 2,558,678 | Garrett | June 26, 1951 |
| 2,658,537 | Ackley | Nov. 10, 1953 |
| 2,730,143 | Ryde | Jan. 10, 1956 |